United States Patent
Jang et al.

(10) Patent No.: US 8,289,285 B2
(45) Date of Patent: Oct. 16, 2012

(54) LIQUID CRYSTAL DISPLAY DEVICE

(75) Inventors: Su Hyuk Jang, Daegu-si (KR); Hwan Joo Lee, Daegu-si (KR)

(73) Assignee: LG Display Co., Ltd., Seoul (KR)

( * ) Notice: Subject to any disclaimer, the term of this patent is extended or adjusted under 35 U.S.C. 154(b) by 916 days.

(21) Appl. No.: 12/318,265

(22) Filed: Dec. 23, 2008

(65) Prior Publication Data

US 2010/0026636 A1    Feb. 4, 2010

(30) Foreign Application Priority Data

Aug. 4, 2008  (KR) .................. 10-2008-0076170

(51) Int. Cl.
  *G06F 3/041*  (2006.01)
  *G09G 3/36*  (2006.01)
(52) U.S. Cl. ......................... 345/173; 345/87
(58) Field of Classification Search .............. 349/12; 345/104, 173, 87
See application file for complete search history.

(56) References Cited

U.S. PATENT DOCUMENTS 7,009,663 B2 *  3/2006  Abileah et al. ................. 349/12
2006/0077186 A1  4/2006  Park et al.

FOREIGN PATENT DOCUMENTS

CN           1752805 A      3/2006

* cited by examiner

*Primary Examiner* — Alexander S Beck
*Assistant Examiner* — Joseph Pena
(74) *Attorney, Agent, or Firm* — Morgan, Lewis & Bockius LLP

(57) ABSTRACT

A liquid crystal display device having a plurality of pixel cells for displaying an image and sensing light incident on the pixel cells, each of the pixel cells includes a pixel circuit that displays an image based on a data voltage supplied from a data line in accordance with a gate signal from a gate line; and a touch sensor that senses light incident on the pixel cell, storing a light sensing signal based on the sensed light, and supplying the stored light sensing signal to a read-out integrated circuit via a read-out line in accordance with a scan signal from a scan line.

1 Claim, 9 Drawing Sheets

LIQUID CRYSTAL DISPLAY DEVICE

This application claims the benefit of Korean Patent Application No. 10-2008-0076170 filed on Aug. 4, 2008, which is hereby incorporated by reference in its entirety.

BACKGROUND OF THE INVENTION

1. Field of the Invention

The present invention relates to a liquid crystal display (LCD) device of an in-cell touch-panel type, and more particularly, to an LCD device capable of securing a sufficient charge time and a sufficient sensor access time for a liquid crystal cell.

2. Discussion of the Related Art

Typically, liquid crystal display (LCD) devices display an image by controlling the light transmittance of a liquid crystal layer, using an electric field applied to the liquid crystal layer in accordance with a video signal. Such an LCD device has advantages of compactness, thinness, and low power consumption. By virtue of such advantages, the LCD device is used for a portable computer such as a notebook PC, an office automation appliance, an audio/video appliance, etc. In particular, an active matrix type LCD device, in which a switching element is provided for each liquid crystal cell, is advantageous in displaying moving pictures because it is possible to control the switching element in an active manner.

A thin film transistor (TFT) is mainly used as the switching element in the active matrix type LCD device.

Recently, a technique for attaching a touch screen panel to an LCD device as mentioned above has been proposed. The touch screen panel generally means a user interface, which is attached to a display device, to sense a touch point varying in electrical characteristics when an opaque object such as a finger or a pen comes into contact with the touch point. The LCD device, to which the touch screen panel is attached, can implement various applications, based on contact position information detected when a user's finger or a pen comes into contact with the screen of the touch screen panel.

However, such an LCD device has various problems such as an increase in costs caused by the touch screen panel, a reduction in productivity caused by an addition of a process for attaching the touch screen panel to an LCD panel, and a degradation in the brightness of the LCD panel, and an increase in the thickness of the LCD panel.

In order to solve the above-mentioned problems, an in-cell touch-panel system has been proposed. In the in-cell touch-panel system, no touch screen panel is used. In place, a touch sensor circuit including a sensor TFT is formed in each pixel cell of the LCD device.

FIG. 1 is a diagram showing timing of a data enable signal used in a related art in-cell touch-panel type LCD device. In the in-cell touch-panel type LCD device, each pixel cell thereof includes a pixel circuit for displaying an image, and a touch sensor circuit for sensing light from the outside of, and incident on, the pixel cell, and supplying a light sensing signal to a read-out integrated circuit, based on the sensed light. The pixel circuit and touch sensor circuit are connected in common to one gate line. Accordingly, the related art in-cell touch panel type LCD device may not be able to simultaneously display an image through the pixel circuit and; read the light sensing signal through the touch sensor circuit. To this end, in the related art LCD device, the image display time is reduced so that the operation for reading the light sensing signal can be carried out during a reserved time generated due to the reduced display time.

In order to reduce the image display time in the related art in-cell touch-panel type LCD device, it may be necessary to increase the time taken to read image data input from the outside of the pixel cell, and to output the read image data. Accordingly, it may be necessary to increase the frequency of the data enable signal functioning to control the output period of the image data.

To secure the time taken to vary the frequency of the data enable signal, the related art LCD device stores the image data in a memory, and controls the output period of the image data stored in the memory when the frequency of the data enable signal varies, using the varied frequency of the data enable signal.

In FIG. 1, "I-DE" represents a first data enable signal, namely, an original data enable signal input from the system, and "O-DE" represents a second data enable signal generated in accordance with a frequency modulation for the first data enable signal I-DE. FIG. 1 shows that the frequency of the second data enable signal O-DE is higher than that of the first data enable signal I-DE. The second data enable signal I-DE is output for a display time, and is not output for the remaining portion of the overall period, namely, a sensor access time.

In the above-mentioned related art case, however, there is a problem in that an increase in manufacture costs occurs because it is necessary to use the memory for storing image data, in order to generate the second data enable signal O-DE. Furthermore, since the second enable signal O-DE has an increased frequency, the display time is reduced. This causes a reduction in the charge time of the liquid crystal cell. As a result, degradation in display quality occurs.

SUMMARY OF THE INVENTION

Accordingly, embodiments of the present invention are directed to a liquid crystal display device that substantially obviates one or more problems due to limitations and disadvantages of the related art.

An object of the present invention is to provide a liquid crystal display device capable of independently driving a pixel circuit and a touch sensor circuit.

Another object of the present invention is to provide a liquid crystal display device capable of providing a sufficient charge time for a liquid crystal cell.

Another object of the present invention is to provide a liquid crystal display device capable of providing a sufficient sensor access time for a liquid crystal cell.

Another object of the present invention is to provide high-speed driving for a sensor in a liquid crystal display device.

An object of the present invention is to enhance a display quality in a liquid crystal display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device having a plurality of pixel cells for displaying an image and sensing light incident on the pixel cells, each of the pixel cells includes a pixel circuit that displays an image based on a data voltage supplied from a data line in accordance with a gate signal from a gate line; and a touch sensor that senses light incident on the pixel cell, storing a light sensing signal based on the sensed light, and supplying the stored light sensing signal to a read-out integrated circuit via a read-out line in accordance with a scan signal from a scan line.

The pixel circuit may include a pixel thin film transistor (TFT) for switching the data voltage from the data line in accordance with the gate signal from the gate line; a liquid crystal cell for rendering an image in accordance with a pixel voltage corresponding to a voltage difference between a data voltage from the pixel TFT and a bias voltage from a bias line; and a storage capacitor for storing the data voltage supplied to the liquid crystal cell for one frame period.

The touch sensor circuit may include a sensor TFT for receiving the bias voltage from the bias line and a drive voltage from a driving line, to generate an optical current in accordance with an amount of external light incident on the pixel cell; a sensor capacitor for storing charges by the optical current from the sensor TFT; and a switch TFT for supplying the charges stored in the sensor capacitor to the read-out integrated circuit via the read-out line in accordance with the scan signal from the scan line.

The liquid crystal display device may further include a gate driver for supplying the gate signal to the gate line, and a scan driver for supplying the scan signal to the scan line.

The gate signal from the gate driver and the scan signal from the scan driver may have the same output timing.

In accordance with the present invention, the pixel circuit and the touch sensor circuit are independently driven by different lines. Accordingly, it is possible to secure a sufficient charge time and a sufficient sensor access time for each liquid crystal cell, thereby achieving an enhancement in display quality and a high-speed operation of the sensor.

Also, it is possible to use a data enable signal input from a system, as it is, without a modulation thereof. Accordingly, it is unnecessary to use a separate memory for storing image data, and thus to reduce the manufacture costs.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF PREFERRED EMBODIMENTS

Reference will now be made in detail to preferred embodiments of the present invention, examples of which are illustrated in the accompanying drawings. Wherever possible, the same reference numbers will be used throughout the drawings to refer to the same or like parts.

Figure 2:
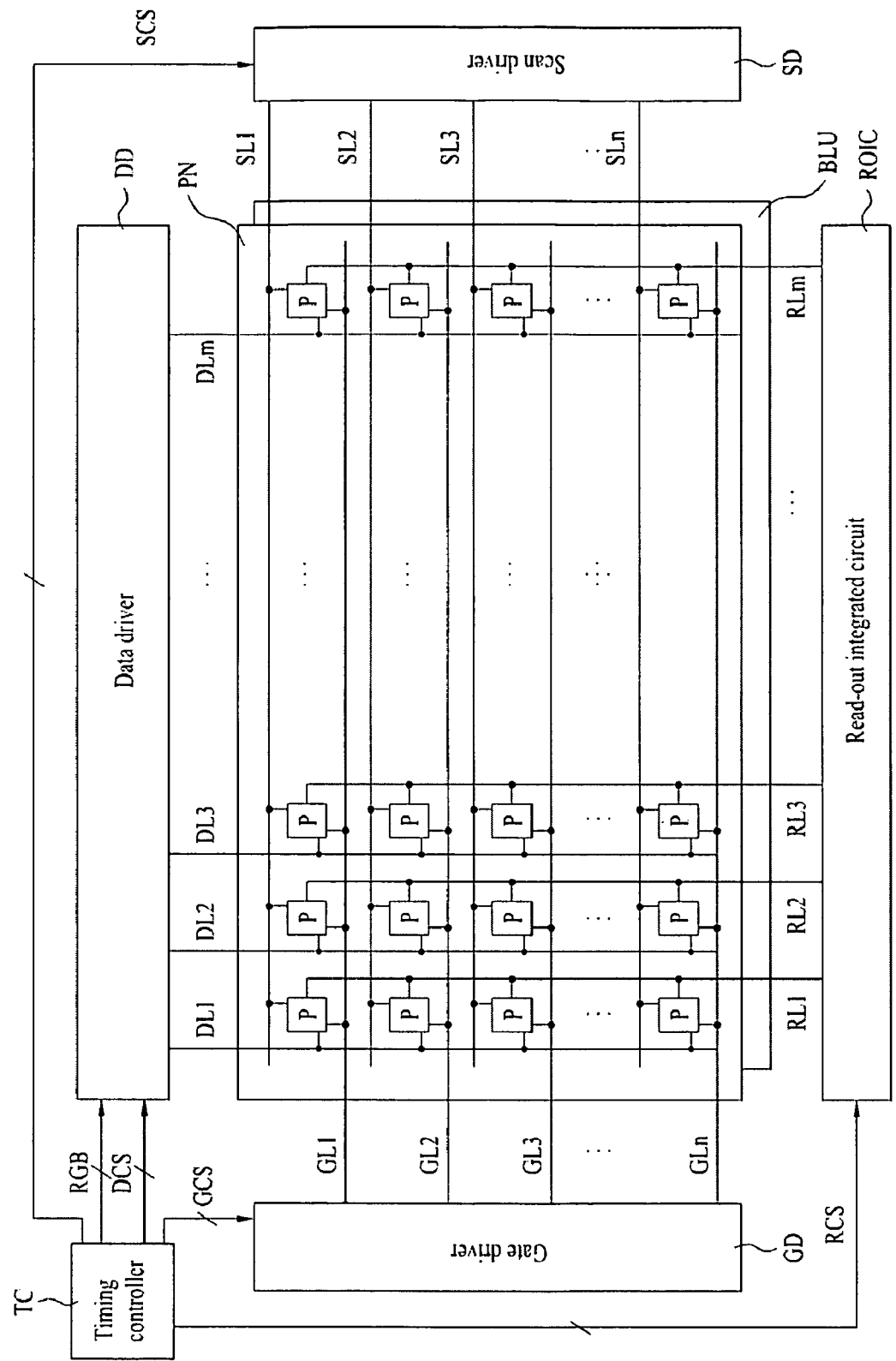
FIG. 2 is a block diagram illustrating an LCD device according to an exemplary embodiment of the present invention.

FIG. 2 is a block diagram illustrating a liquid crystal display (LCD) device according to an exemplary embodiment of the present invention. Referring to FIG. 2, the LCD device includes an LCD panel PN including a plurality of pixel cells P respectively at pixel regions defined by crossing of a plurality of gate lines GL1 to GLn, a plurality of scan lines SL1 to SLn, a plurality of data lines DL1 to DLm, and a plurality of read-out lines RL1 to RLm. The LCD device also includes a data driver DD for supplying a data voltage to the data lines DL1 to DLm, a gate driver GD for sequentially supplying a gate signal to the gate lines GL1 to GLn, and a scan driver SD for sequentially supplying a scan signal to the scan lines SL1 to SLn. The LCD device further includes a read-out integrated circuit ROIC for receiving optical current from the pixel cells P via the read-out lines RL1 to RLm, a timing controller TC for controlling the driving timing of the read-out integrated circuit ROIC, and a backlight unit BLU for irradiating light to a back surface of the LCD panel PN.

The LCD panel PN includes an upper substrate including color filters, a lower substrate formed with pixel cells P each including a pixel circuit and a touch sensor circuit, and a liquid crystal layer interposed between the upper and lower substrates.

The gate lines GL1 to GLn, scan lines SL1 to SLn, data lines DL1 to DLm, and read-out lines RL1 to RLm are formed on the lower substrate of the LCD panel PN. Also, bias lines for transferring a bias voltage and driving lines for transferring a drive voltage are formed on the lower substrate.

The data driver DD converts digital image data R, G, and B into an analog gamma-compensated voltage, based on gamma reference voltages GMA from a gamma reference voltage generator (not shown), in response to a data control signal DCS from the timing controller TC. The data driver DD then supplies the gamma-compensated voltage to the data lines DL1 to DLm, as a data voltage.

The gate driver GD generates a gate signal in response to a gate control signal GCS from the timing controller TC, and then sequentially supplies the gate signal to the gate lines GL1 to GLn, to sequentially select horizontal lines of the LCD panel PN, to which the data voltage is supplied.

The scan driver SD generates a scan signal in response to a scan control signal SCS from the timing controller TC, and sequentially supplies the scan signal to the scan lines SL1 to SLn, to sequentially select the horizontal lines of the LCD panel PN, to which the optical current is supplied.

The timing controller TC re-arranges the digital image data R, G, and B supplied from the system (not shown) such that the digital image data R, G, and B meet the LCD panel, and then supplies the re-arranged digital image data R, G, and B to the data driver DD. The timing controller TC generates the data control signal DCS to control the data driver DD, the gate control signal GCS to control the gate driver GD, the scan control signal SCS to control the scan driver SD, and the read-out control signal RCS to control the read-out integrated circuit ROIC, using timing control signals Vsync, Hsync, DCLK, and DE supplied from the system.

The backlight unit BLU includes a plurality of lamps arranged at the back side of the LCD panel PN, to overlap with the LCD panel PN. Each of the lamps used in the backlight unit BLU may be a cold cathode fluorescent lamp (CCFL), an external electrode fluorescent lamp (EEFL), or a heat cathode fluorescent lamp (HCFL). Each lamp irradiates light to the back surface of the LCD panel PN in accordance with driving of an inverter (not shown). Meanwhile, the backlight unit BLU may include a plurality of light emitting diodes, in place of the lamps or together with the lamps.

The read-out integrated circuit ROIC includes a plurality of integrated circuits respectively connected to the read-out lines RL1 to RLm of the LCD panel PN. The read-out integrated circuit ROIC converts a light sensing signal supplied from each of the read-out lines RL1 to RLm into a digital signal, and supplies the digital signal to the system (not shown). The system executes a touch recognition process and a coordinate calculation process through a touch algorithm, and then reflects the results of the process execution to the LCD panel PN.

Meanwhile, although not shown, the LCD device according to the present invention further includes a drive voltage supplying circuit for supplying the bias voltage to the bias lines, and supplying the drive voltage to the driving lines.

Figure 3:
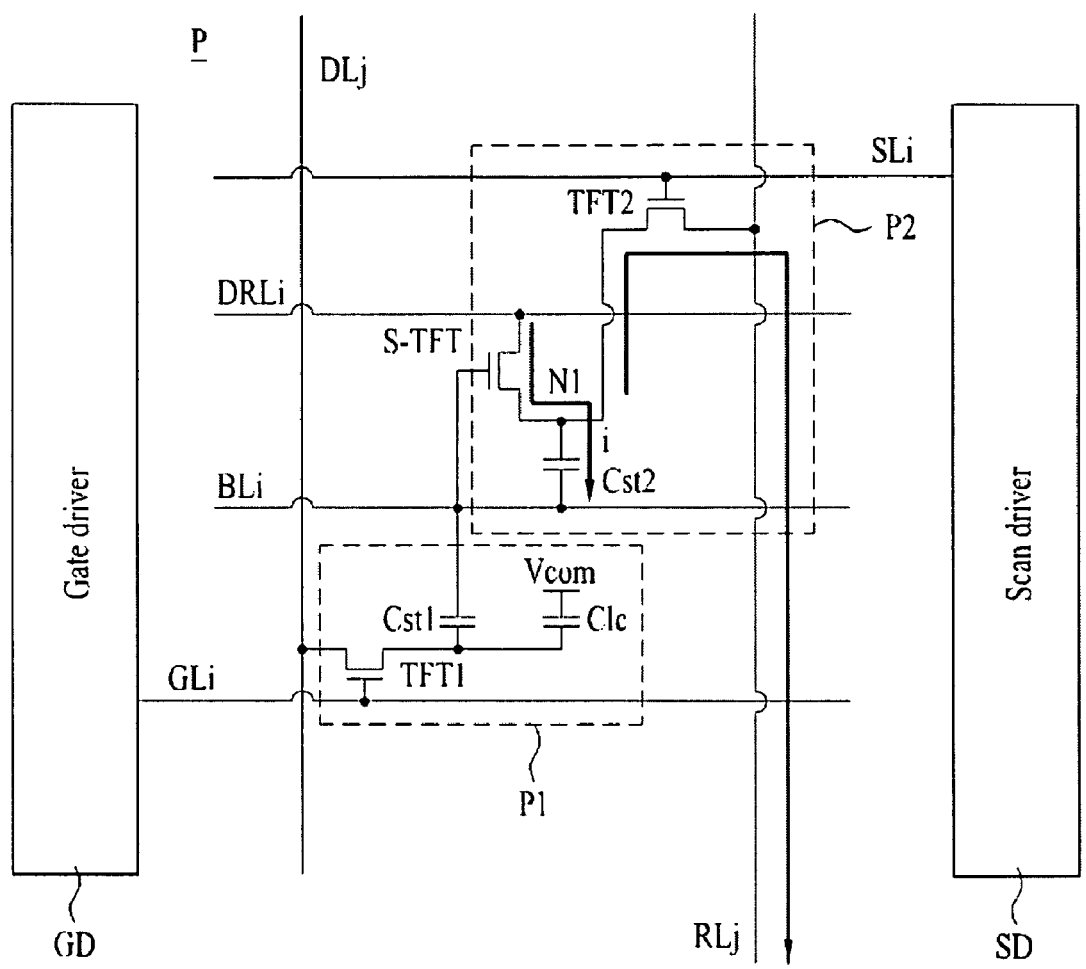
FIG. 3 is an equivalent circuit diagram of one pixel P shown in FIG. 2.

FIG. 3 is an equivalent circuit diagram of one pixel P shown in FIG. 2. As shown in FIG. 3, the pixel circuit P1 of each pixel cell P displays an image based on a data voltage supplied from the corresponding data line in accordance with a gate signal from the corresponding gate line. The touch sensor circuit P2 of each pixel cell P senses light supplied from the outside of the pixel cell P, stores a light sensing signal based on the sensed light, and supplies the stored light sensing signal to the read-out integrated circuit ROIC via the corresponding read-out line in accordance with the scan signal from the corresponding scan line.

That is, the pixel circuit P1 and touch sensor circuit P2 included in each pixel cell P are independently driven in accordance with signals supplied from different lines. In other words, the pixel circuit P1 is driven in accordance with the gate signal from the corresponding gate line, whereas the touch sensor circuit P2 is driven in accordance with the scan signal from the corresponding scan line.

Thus, in accordance with the present invention, it is possible to simultaneously display an image through the pixel circuit and read a light sensing signal through the touch sensor circuit.

Referring to FIG. 3, the pixel P includes a pixel circuit P1 formed in a region defined by a crossing of an i-th gate line GLi and a j-th data line DLj, and a touch sensor circuit P2 formed in a region defined by crossing of an i-th bias line BLi, an i-th driving line DRLi, and a j-th read-out line RLj.

The pixel circuit P1 includes a liquid crystal cell Clc, a pixel TFT TFT1 formed at the crossing of the gate line GLi and the data line DLj to drive the liquid crystal cell Clc, and a storage capacitor Cst1 for maintaining a voltage charged in the liquid crystal cell Clc for one frame.

The pixel TFT TFT1 supplies a data voltage supplied via the data line DLj to a pixel electrode of the liquid crystal cell Clc in response to a gate signal from the gate line GLi. For this function, the pixel TFT TFT1 includes a gate electrode connected to the gate line GLi, a source electrode connected to the data line DLj, and a drain electrode connected to the pixel electrode of the liquid crystal cell Clc. The liquid crystal cell Clc is charged by a voltage difference between the data voltage and a common voltage Vcom, namely, a pixel voltage. The arrangement of Liquid crystal molecules in the liquid crystal cell Clc is varied by an electric field generated due to the voltage difference, so that the liquid crystal cell Clc can adjust the amount of light passing therethrough or can shield the light. The storage capacitor Cst1 is connected between the drain electrode of the pixel TFT TFT1 and the driving line DRLi.

The touch sensor circuit P2 includes a sensor TFT S-TFT for generating an optical current i in an amount determined in accordance with the amount of light received from the outside of the pixel, without generating the optical current i during a period in which the drive voltage is maintained at a low voltage level VL, a sensor capacitor Cst2 for storing charges generated by the optical current i, and a switch TFT TFT2 for switching the charges stored in the sensor capacitor Cst2 to the read-out line RLj.

The sensor TFT S-TFT includes a gate electrode connected to the bias line BLi, a source electrode connected to the driving line DRLi, and a drain electrode connected to a first node N1. A bias voltage set to a voltage equal to or lower than a threshold voltage of the sensor TFT S-TFT is supplied to the gate electrode of the sensor TFT S-TFT. The drive voltage is supplied to the source electrode of the sensor TFT S-TFT. The sensor TFT S-TFT performs a light sensing operation in accordance with a finger touch operation. The sensor TFT S-TFT is not covered by a black matrix formed on the upper substrate, while both the pixel TFT TFT1 and switch TFT TFT2 are converted by the black matrix. Accordingly, the sensor TFT S-TFT generates an optical current i in response to light received from the outside of the pixel. The generated optical current i has a current amount determined in accordance with whether or not the sensor TFT S-TFT corresponds to a touch point. In other words, in an environment maintained at an illumination intensity lower than that of the backlight (namely, an indoor environment), the sensor TFT S-TFT generates an optical current i in a large amount when the sensor TFT S-TFT corresponds to the touch point, as compared to the case in which the sensor TFT S-TFT does not correspond to the touch point. On the other hand, in an environment maintained at an illumination intensity higher than that of the backlight (namely, an outdoor environment), the sensor TFT S-TFT generates an optical current i in a small amount when the sensor TFT S-TFT corresponds to the touch point, as compared to the case in which the sensor TFT S-TFT does not correspond to the touch point.

Charges generated by the optical current i are stored in the sensor capacitor Cst2 connected between the first node N1 and the bias line BLi. The voltage of the first node N1 is gradually increased by the charges stored in the sensor capacitor Cst2 until the switch TFT TFT2 turns on. The voltage of the first node N1 is determined in accordance with whether or not the sensor TFT S-TFT corresponds to the touch point. In other words, in an environment maintained at an illumination intensity lower than that of the backlight (namely, an indoor environment), the voltage of the first node N1 is high when the sensor TFT S-TFT corresponds to the touch point, as compared to the case in which the sensor TFT S-TFT does not correspond to the touch point. On the other hand, in an environment maintained at an illumination intensity higher than that of the backlight (namely, an outdoor environment), the voltage of the first node Ni is low when the sensor TFT S-TFT corresponds to the touch point, as compared to the case in which the sensor TFT S-TFT does not correspond to the touch point.

The switch TFT TFT2 includes a gate electrode connected to the i-th scan line SLi, a source electrode connected to the first node N1, and a drain electrode connected to the i-th read-out line RLj. The switch TFT TFT2 turns on in response to the scan signal supplied to the i-th scan line SLi. In the ON state, the switch TFT TFT2 outputs the voltage of the first node N1 to the i-th read-out line RLj, as an optical sensing signal.

As described above, in accordance with the present invention, the pixel TFT TFT1 of the pixel circuit P1 is driven by the gate signal from the gate line GLi, whereas the sensor TFT S-TFT of the touch sensor circuit P2 is not driven by the gate signal from the gate line GLi, but by the scan signal from the scan line SLi. Thus, it is possible to simultaneously drive the pixel TFT TFT1 and the sensor TFT S-TFT.

Figure 4:
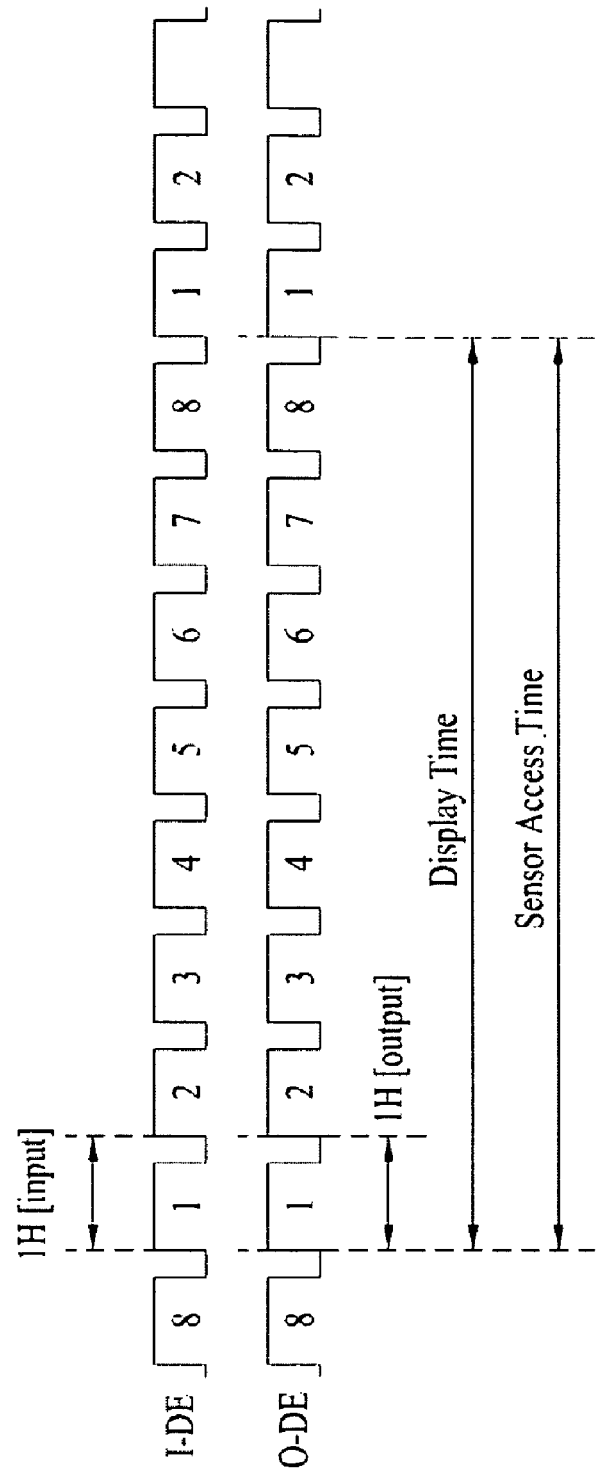
FIG. 4 is a diagram showing timing of the data enable signal supplied to the data driver DD included in the LCD device according to an embodiment of the present invention.

FIG. 4 is a diagram showing timing of the data enable signal supplied to the data driver DD included in the LCD device according to an embodiment of the present invention. Referring to FIG. 4, it can be seen that the first data enable signal I-DE input to the timing controller TC from the system and the second data enable signal O-DE input to the data driver DD from the timing controller TC have the same waveform. In other words, there is no problem even if the display time for which an image is displayed through the pixel circuit P1 and the sensor access time for which a light sensing signal is read through the touch sensor circuit P2 overlap with each other. This is because the pixel circuit P1 and the touch sensor circuit P2 are independently driven by different signals.

Moreover, in accordance with the present invention, the first data enable signal I-DE is also used as the second data enable signal O-DE, without being demodulated. Accordingly, it is unnecessary to provide a time for modulating the first data enable signal I-DE, and thus a memory for temporarily storing image data R, G, and B is not needed.

Also, in accordance with the present invention, the first data enable signal I-DE is used as it is, without being increased in frequency, different from the related art case. Accordingly, it is possible to secure a sufficient charge time for the liquid crystal cell, and thus to achieve an enhancement in display quality.

FIGS. 5A to 5E are diagrams depicting the waveforms of various signals supplied to the LCD device according to the present invention. In FIGS. 5A to 5E, "D-GSP" represents a display gate start pulse, "D-GSC" represents a display gate shift clock, and "D-GOE" represents a display gate output enable signal. The signals D-GSP, D-GSC, and D-GOE are supplied to the gate driver GD as the gate control signal GCS. Using the gate control signal GCS, the gate driver GD generates a gate signal which is, in turn, output in a sequential manner. That is, the gate driver GD shifts the display gate start pulse D-GSP in accordance with the display gate shift clock D-GSC, thereby generating the gate signal. The display gate output enable signal D-GOE is a signal for setting the output period of the gate signal.

In FIGS. 5A to 5E, "S-GSP" represents a sensing gate start pulse, "S-GSC" represents a sensing gate shift clock, and "S-GOE" represents a sensing gate output enable signal. The signals S-GSP, S-GSC, and S-GOE are supplied to the scan driver SD as the scan control signal SCS. Using the scan control signal SCS, the scan driver SD generates a scan signal which is, in turn, output in a sequential manner. That is, the scan driver SD shifts the sensing gate start pulse S-GSP in accordance with the sensing gate shift clock S-GSC, thereby generating the scan signal. The sensing gate output enable signal S-GOE is a signal for setting the output period of the scan signal.

In FIGS. 5A to 5E, "R-RST" represents a read-out reset signal for controlling operation of the read-out integrated circuit ROIC. When the read-out reset signal is at a low level, the read-out integrated circuit ROIC operates to read a light sensing signal from the corresponding read-out line.

Figure 1:
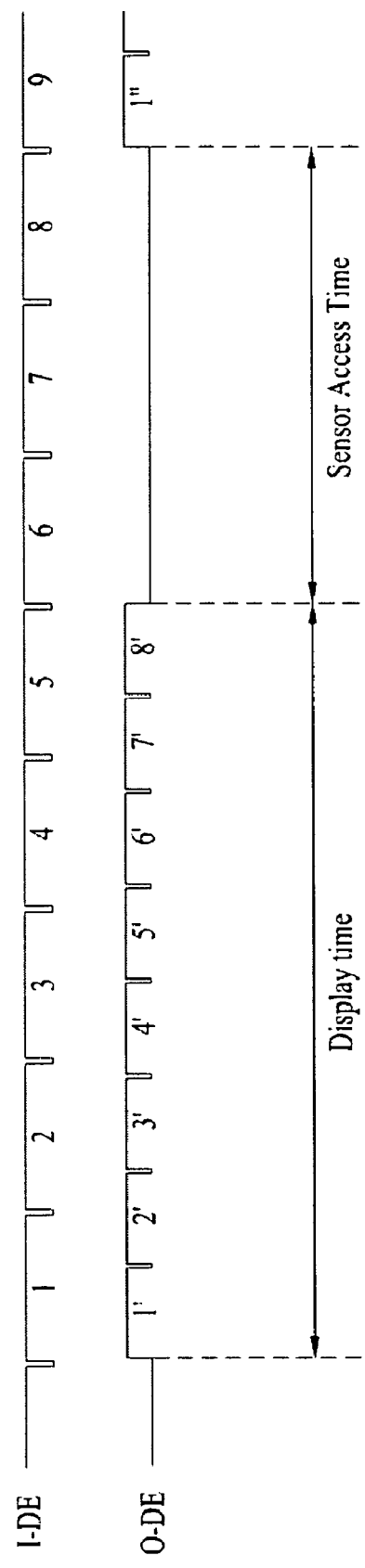
FIG. 1 is a diagram showing timing of a data enable signal used in a related art in-cell touch-panel type liquid crystal display (LCD) device.

Meanwhile, although each pixel cell P includes one pixel circuit P1 and one touch sensor circuit P2 in the case of FIG. 1, one touch sensor circuit P2 may be provided for every 8 pixel cells P. That is, touch sensor circuits P2 may be provided at 8n-th ones ("n" is a natural number) of the pixel cells P vertically arranged along the data lines, respectively.

Figure 5A:
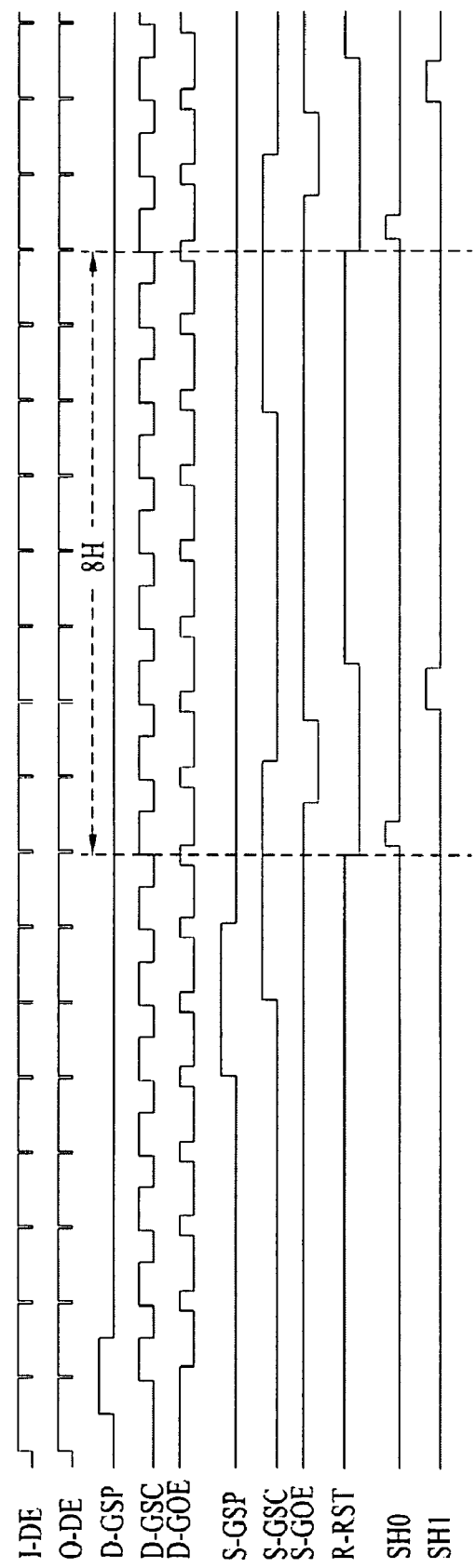
FIGS. 5A to 5E are diagrams depicting the waveforms of various signals supplied to the LCD device according to the present invention.
Figure 5B:
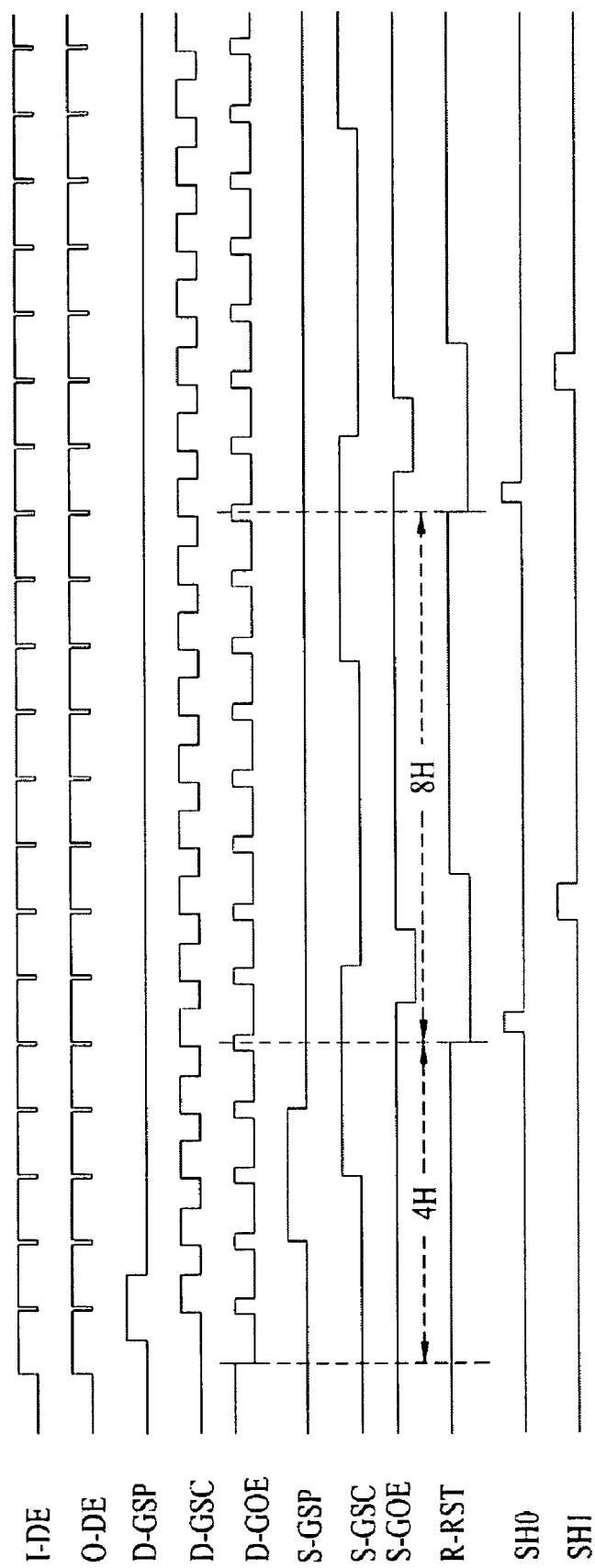
Figure 5C:
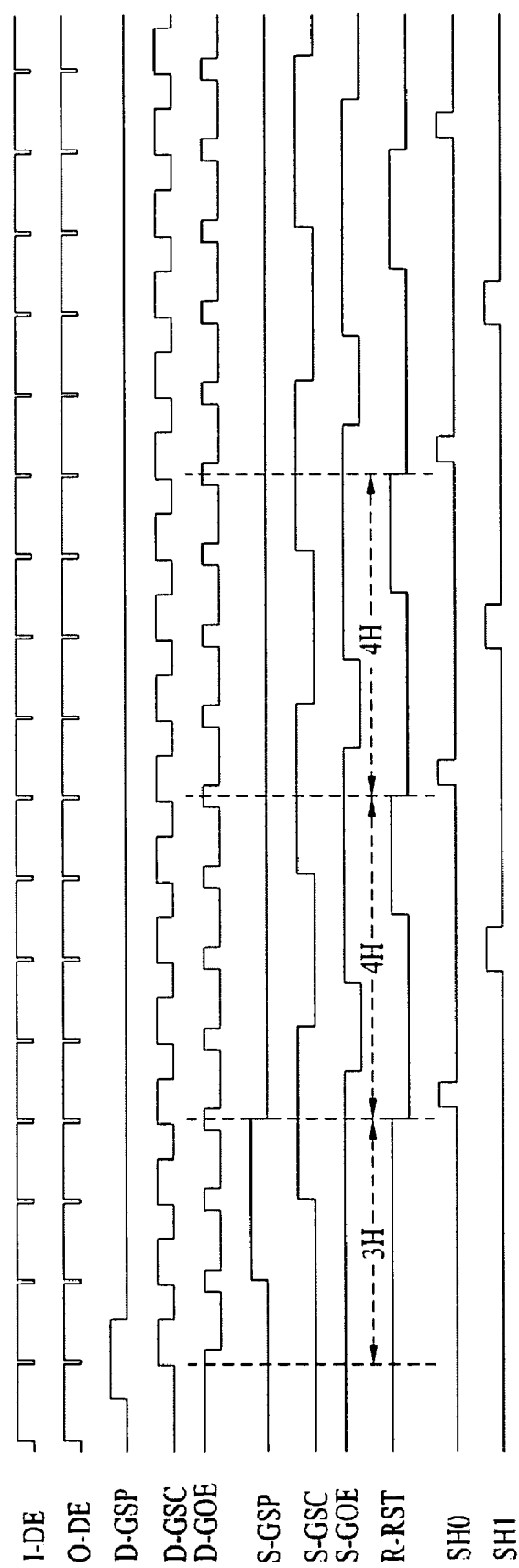

FIG. 4 and FIGS. 5A to 5E show the waveforms of various signals supplied to an LCD device, in which the touch sensor circuits P2 are provided only at 8n-th pixel cells P, respectively. In particular, where a light sensing signal from each touch sensor circuit P2 is read at intervals of a 4H time (horizontal time), as shown in FIG. 5C, it is possible to set a sensor access frame rate such that the sensor access frame rate corresponds to double of a display frame rate. For example, where the display frame rate is set to 60 Hz, the sensor access frame rate can be set to double of the display frame rate, namely, 120 Hz. On the other hand, where the touch sensor circuits P2 are provided at 4n-th pixel cells P, other than 8n-th pixel cells P, respectively, it is possible to set the sensor access frame rate to 60 Hz, without a reduction in the charge time of each liquid crystal cell.

Figure 5D:
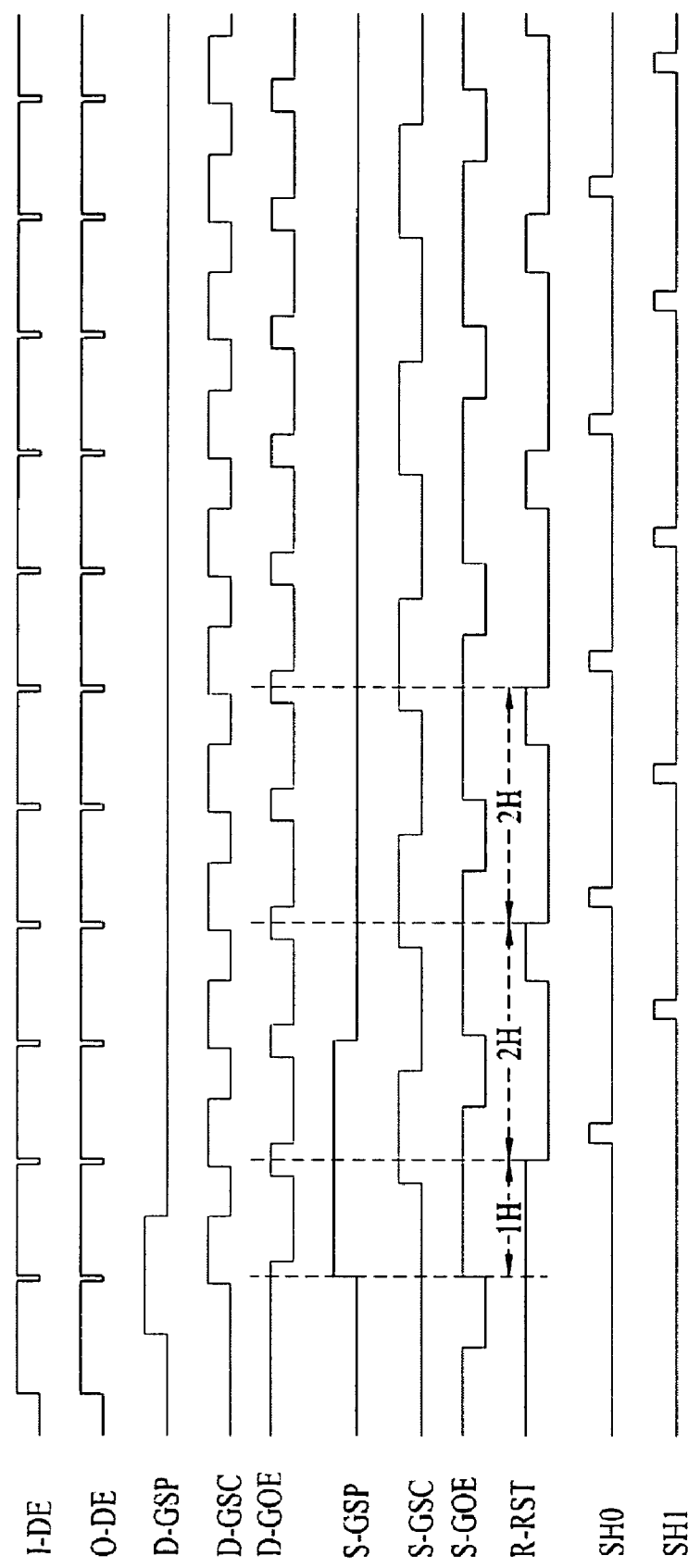
Figure 5E:
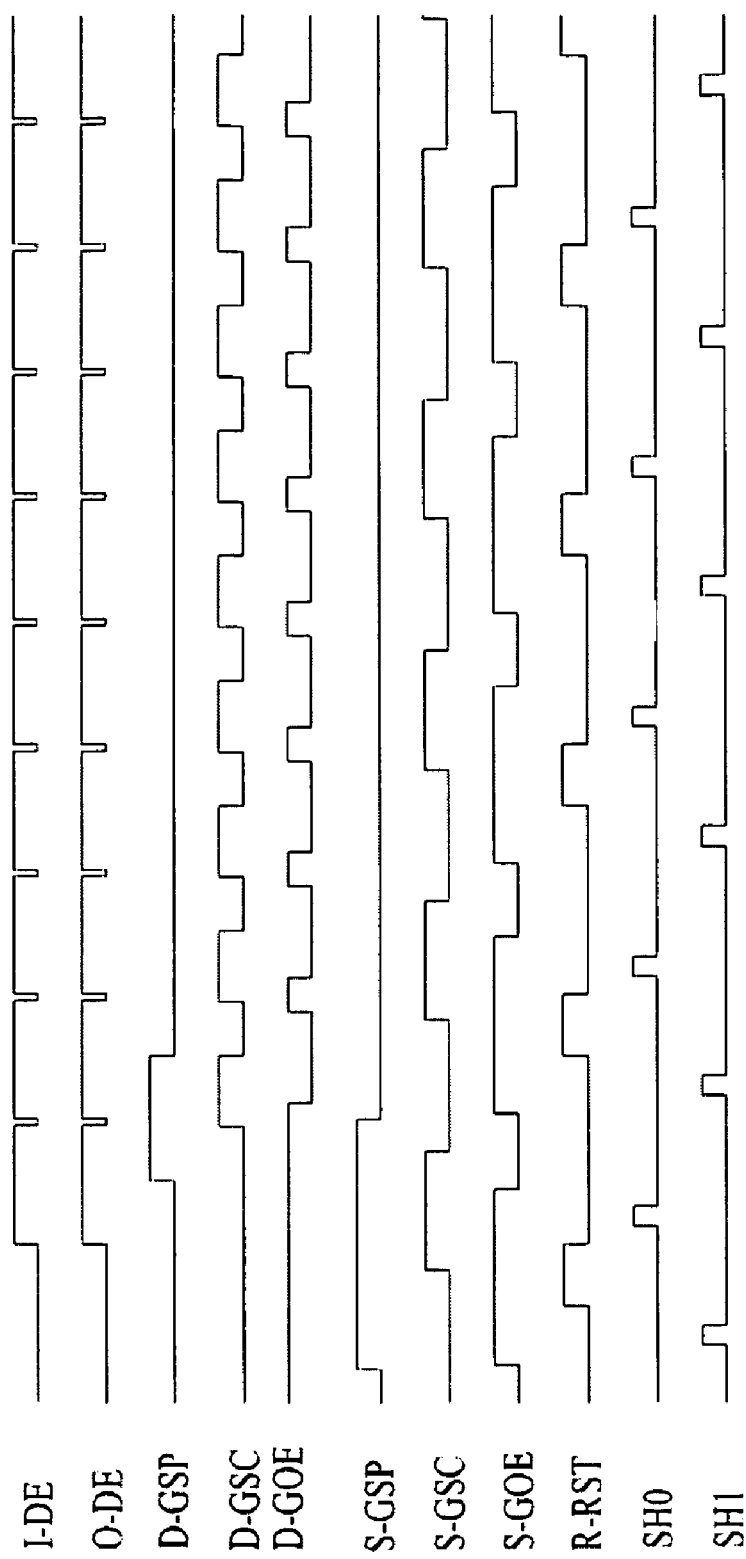

The sensor access frame rate may be set to 4 times the display frame rate, as shown in FIG. 5D. For example, where the display frame rate is set to 60 Hz, the sensor access frame rate can be set to 4 times the display frame rate, namely, 240 Hz. On the other hand, where the touch sensor circuits P2 are provided at 2n-th pixel cells P, other than 8n-th pixel cells P, respectively, it is possible to set the sensor access frame rate to 60 Hz, without a reduction in the charge time of each liquid crystal cell.

As can be seen from FIGS. 5C and 5D, it is possible to achieve a high-speed sensing operation by increasing the sensor access frame rate.

"SH0" and "SH1" represent data signals to be displayed on the screen in accordance with light sensing signals read by the read-out integrated circuit.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device having a plurality of pixel cells for displaying an image and sensing light incident on the pixel cells, each of the pixel cells comprising:

a pixel circuit that displays an image based on a data voltage supplied from a data line in accordance with a gate signal from a gate line; and a touch sensor circuit configured to:

sense light incident on the pixel cell;

store a light sensing signal based on the sensed light; and supply the stored light sensing signal to a read-out integrated circuit via a read-out line in accordance with a scan signal from a scan line, wherein the liquid crystal display device comprises:

a data driver, a timing controller, a gate driver for supplying the gate signal to the gate line, and a scan driver for supplying the scan signal to the scan line, wherein a first data enable signal input to the timing controller from a system and a second data enable signal input to the data driver from the timing controller have the same waveform, wherein the pixel circuit comprises:

a pixel thin film transistor (TFT) for switching the data voltage from the data line in accordance with the gate signal from the gate line, a liquid crystal cell for rendering an image in accordance with a pixel voltage corresponding to a voltage difference between a data voltage from the pixel TFT and a bias voltage from a bias line, and a storage capacitor for storing the data voltage supplied to the liquid crystal cell for one frame period, wherein the touch sensor circuit comprises:

a sensor TFT configured to receive the bias voltage from the bias line and a drive voltage from a driving line, to generate an optical current in accordance with an amount of light received from the outside of the pixel cell, the bias voltage and the drive voltage being separate and distinct from one another, a sensor capacitor for storing charges by the optical current from the sensor TFT, and a switch TFT for supplying the charges stored in the sensor capacitor to the read-out integrated circuit via the read-out line in accordance with the scan signal from the scan line, wherein the storage capacitor is connected between a drain electrode of the pixel TFT and the bias line, wherein the sensor TFT comprises:

a gate electrode connected to the bias line, a source electrode connected to the driving line, and a drain electrode connected to a first node, and wherein the gate signal from the gate driver and the scan signal from the scan driver have the same output timing.

* * * * *